United States Patent [19]
Kraus

[11] 3,870,758
[45] Mar. 11, 1975

[54] CATALYTIC PREPARATION OF FORMANILIDE

[75] Inventor: Theodore C. Kraus, Cheshire, Conn.

[73] Assignee: Olin Corporation, New Haven, Conn.

[22] Filed: Oct. 10, 1973

[21] Appl. No.: 405,249

[52] U.S. Cl............................................ 260/562 R
[51] Int. Cl........................................ C07c 103/24
[58] Field of Search............................ 260/562, 560

[56] References Cited
UNITED STATES PATENTS
3,781,351   12/1973   Fenton................................ 260/562

Primary Examiner—Harry I. Moatz
Attorney, Agent, or Firm—Robert L. Andersen

[57] ABSTRACT

Process for preparing formanilide by reacting aniline with carbon monoxide in the presence of a catalytic amount of nickel bis-quinoline diiodide ($Ni(C_9H_7N)_2I_2$) at elevated temperature and pressure.

2 Claims, No Drawings

CATALYTIC PREPARATION OF FORMANILIDE

BACKGROUND OF THE INVENTION

1. Field of Invention

The present invention relates to the carbonylation of aniline at elevated temperature and pressure to produce formanilide.

2. Prior Art

Formanilides are commonly used intermediates in the pharmacentical industry, such use being well known to those skilled in the art. Formanilides are also intermediates in the formation of isocyanates which are used in urethane foams. Formanilide itself is useful for medicinal purposes as an antiseptic and shares the other uses of formanilides generally.

The classical method for preparing formanilide is to non-catalytically react aniline with formic acid, its salts or esters, generally at elevated temperatures. See De-Jonge, A.P., VanderVen, B., and Den Hertog, W., Rec. Trav. Chem 75, 5 (1956) describing the various conventional routes to anilides.

More recent work has explored the carbonylation of aniline and other amines. For example, Rosenthal, A., Can. J. Chem. 40, 1718 (1962) reports that the reaction of aniline and carbon monoxide under pressure produces sym-diphenyl urea as the principal product. Japanese Patent 6890 (1967) teaches that ureas are the main products of carbonylation of primary and secondary amines with carbon monoxide in the presence of $PdCPdCl_2$ in benzene. See Chem Abstract 67, 11325m (1967). Aliev et al. confirmed that ureas were formed upon carbonylation of aniline, that $NiI_2$ was the best of catalysts tested and further, that no formanilide was formed. See Aliev, Y. Y., Rumanova, I. B. and Freidlin, L. Kh., Uz Khim. Zh 5, 54 (1961) and chem Abstracts 27 8413 (1962).

In 1969, Saegusa et al. reported that copper and silver chlorides were inactive in the reaction of aromatic amines with carbon monoxide but that chloroauric acid ($HauCl_4 \cdot 4H_2O$) was active as a catalyst in the reaction of aniline and carbon monoxide to produce a low yield (17 percent) of formanilide. See Saegusa, T. Kobayski, S., and Its, Y., Bull Chem. Soc. Japan 42, 2610 (1969). Such a yield is commercially unacceptable in view of the expense of the catalyst and the overall expense of the process.

Thus the prior art has traditionally employed methods other than carbonylation reactions to form anilides. Furthermore, the art generally teaches the formation of ureas rather than anilides from carbonylation of an aromatic amine. Finally the only known catalyzed reaction of an amine with carbon monoxide to produce formanilide produces the same in such low yields that the process is of no commercial significance.

I have discovered, however, that if aniline and carbon monoxide are reacted at elevated temperature and pressure in the presence of a nickel bis-quinoline diiodide as a catalyst, a yield of about 70% formanilide may be obtained. This is a significant and unexpected improvement in yields over that obtained utilizing chloroauric acid and this improvement provides a catalytic carbonylation process which is a commercially competitive with other means for producing formanilide.

SUMMARY OF THE INVENTION

I have discovered that formanilide may be produced in commercially satisfactory yields by reacting aniline with carbon monoxide at elevated temperature and pressure in the presence of a catalytic amount of nickel bis-quinoline diiodide. Formanilide is useful as an antiseptic, as an intermediate in the preparation of various pharmaceutical compounds and as a precursor to isocyanates which are used to make urethanes.

DETAILED DESCRIPTION

The desired amount of aniline and catalyst is added to an organic solvent. The mixture is placed in a pressurizable container and the container is closed, pressurized with carbon monoxide then heated for a desired period of time with agitation. Upon completion of the reaction, formanilide is recovered as the principal product utilizing known recovery means.

While in the preferred embodiment, the solvent selected was o-dichlorobenzene, any organic solvent in which aniline is soluble, for example, benzene, xylene, toluene, mono-chlorobenzene or other organic solvents may suitably be used in the reaction.

The reaction is carried out at an elevated temperature, suitably in the range of 150°–325°C. and preferably in the range of 175°–275°C. The reaction may also be carried out at higher temperatures by suitably shortening reaction times.

Elevated pressures must also be employed. A wide range of pressures may be used but pressures in the range of 1000 psig to 5000 psig are suitable. I prefer to carry out the reaction at a pressure in the range of 2500 psig to 4000 psig.

The reaction time may vary considerably depending on temperature, pressure and physical factors. For example, it is preferred to stir or agitate the reaction mixture during the reaction period. This assures that there will be adequate contact between aniline and gaseous carbon monoxide. While the reaction could be conducted without stirring or agitation, the reaction time would be significantly increased. I have found that if the reaction mixture is continuously agitated at a temperature of about 200°C. and 3000 psig 2 to 3 hours will be required to convert approximately 34 percent of the starting aniline. At higher pressures and/or temperatures, one would expect even higher conversion in the same period of time.

The novelty of my invention resides in utilizing nickel bis-quinoline diiodide ($Ni(C_9H_7N)_2I_2$) as a catalyst for the carbonylation reaction. A review of the literature cited above reveals that the principal product formed in the carbonylation of an amine is largely dependent on the catalyst used in the reaction. Several nickel containing catalysts have been used by others, some of which even contain iodine. These catalysts produce ureas, formamides and other products but not formanilide. It is only through the use of nickel bis-quinoline diiodide under the conditions recited herein that formanalide is formed as the principal reaction product.

In catalyzing the reaction of aniline with carbon monoxide, any catalytic amount of nickel bis-quinoline diiodide may suitably be used. I have found that it is desirable to utilize for each gram of aniline at least 0.05 grams of catalyst and as much as 2.5 grams per gram of aniline may be used if desired. It is preferable, however, to utilize a catalyst to aniline weight ratio in the range of 0.1 to 1.0.

The catalyst of the present invention is readily available and inexpensive and its use in the production of formanilide as herein above described provides an inexpensive source of formanilide.

The process of the invention may suitably be employed in a batch process as shown in the accompanying example or in a continuous process wherein unused aniline is recycled.

EXAMPLE

A mixture of 3.0 g of aniline, 0.6 g of nickel bis-quinoline diiodide, and 13.5 g of o-dichlorobenzene was added to a glass vessel which was fitted into a 300 ml – 316 ss shaker autoclave. The system was pressurized with 3050 psig of carbon monoxide and then heated for 3 hours at 220° with constant agitation. When cooled the autoclave was de-pressurized. The contents were filtered and the solution was analyzed by vapor phase chromatography, which indicated a 34 percent consumption of aniline and a 70 percent yield of formanilide based on aniline consumed. A sample of solids, isolated from the o-dichlorobenzene solution was examined by mass spectroscopy and was found to be identical with an authentic sample of formanilide.

What is claimed is:

1. A process for the preparation of formanilide which comprises reacting aniline with carbon monoxide in the presence of a catalytic amount of nickel-bis-quinoline diiodide at a temperature of 150°–325°C. and at an elevated pressure in the range of 1000 to 5000 psig.

2. The process of claim 1 wherein the weight ratio of catalyst to aniline is 0.1:1 to 1:1.

* * * * *